US012689827B2

(12) United States Patent
Shin et al.

(10) Patent No.: US 12,689,827 B2
(45) Date of Patent: Jul. 21, 2026

(54) DRIVING APPARATUS FOR CAMERA AND CAMERA MODULE INCLUDING DRIVING APPARATUS FOR CAMERA

(71) Applicant: Samsung Electro-Mechanics Co., Ltd., Suwon-si (KR)

(72) Inventors: Dooseub Shin, Suwon-si (KR); Sanghyun Ji, Suwon-si (KR); Ju Ho Kim, Suwon-si (KR); Donghoon Lee, Suwon-si (KR); Dohwan Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 111 days.

(21) Appl. No.: 18/516,179

(22) Filed: Nov. 21, 2023

(65) Prior Publication Data

US 2024/0259685 A1 Aug. 1, 2024

(30) Foreign Application Priority Data

Feb. 1, 2023 (KR) ........................ 10-2023-0013877
Jun. 19, 2023 (KR) ........................ 10-2023-0078248

(51) Int. Cl.
*H04N 23/68* (2023.01)
*H04N 23/54* (2023.01)
*H04N 23/55* (2023.01)

(52) U.S. Cl.
CPC ........... *H04N 23/687* (2023.01); *H04N 23/54* (2023.01); *H04N 23/55* (2023.01)

(58) Field of Classification Search
CPC ....... H04N 23/687; H04N 23/54; H04N 23/55

USPC ...................................................... 348/208.11
See application file for complete search history.

(56) References Cited

U.S. PATENT DOCUMENTS

2002/0135896 A1 9/2002 Nomura et al.
2015/0103195 A1 4/2015 Kwon et al.
2015/0296112 A1 10/2015 Park et al.
2017/0139225 A1* 5/2017 Lim ..................... G02B 27/646
2018/0115715 A1 4/2018 Jung et al.
(Continued)

FOREIGN PATENT DOCUMENTS

KR 10-2015-0042690 A 4/2015
KR 10-2015-0118005 A 10/2015
KR 10-2017-0056387 A 5/2017
(Continued)

OTHER PUBLICATIONS

Korean Office Action issued on Aug. 5, 2025 in corresponding Korean Patent Application No. 10-2023-0078248 (8 pages in English and 7 pages in Korean).
(Continued)

*Primary Examiner* — Lin Ye
(74) *Attorney, Agent, or Firm* — NSIP Law

(57) ABSTRACT

A driving apparatus for a camera includes a first frame including a first ball guide extending in a first direction transverse to an optical axis; a second frame including a second ball guide corresponding to the first ball guide and extending in a second direction transvers to the optical axis and the first direction; a ball member disposed between the first ball guide and the second ball guide; and a retainer interposed between the first frame and the second frame and including a through hole in which the ball member is disposed.

27 Claims, 21 Drawing Sheets

(56) References Cited

U.S. PATENT DOCUMENTS

2019/0294027 A1 * 9/2019 Kim ......................... G03B 5/00
2021/0271049 A1   9/2021 Seo et al.

FOREIGN PATENT DOCUMENTS

| KR | 10-1804921 | B1 | 1/2018 | |
| KR | 10-2018-0135270 | A | 12/2018 | |
| KR | 10-2020-0132462 | A | 11/2020 | |
| KR | 20210082988 | A * | 7/2021 | .............. G03B 5/02 |
| KR | 10-2021-0110139 | A | 9/2021 | |
| KR | 10-2022-0007335 | A | 1/2022 | |

OTHER PUBLICATIONS

Korean Notice of Allowance issued on May 13, 2026, in counterpart Korean Patent Application No. 10-2023-0078248. (2 pages in English, 3 pages in Korean).

* cited by examiner

VI-VI'

VII–VII'

VIII-VIII'

DRIVING APPARATUS FOR CAMERA AND CAMERA MODULE INCLUDING DRIVING APPARATUS FOR CAMERA

CROSS-REFERENCE TO RELATED APPLICATIONS

This application claims the benefit under 35 USC 119(a) of Korean Patent Application Nos. 10-2023-0013877 filed on Feb. 1, 2023, and 10-2023-0078248 filed on Jun. 19, 2023, in the Korean Intellectual Property Office, the entire disclosures of which are incorporated herein by reference for all purposes.

BACKGROUND

1. Field

The present disclosure relates to a driving apparatus for a camera and a camera module including a driving apparatus for the camera.

2. Description of Related Art

A camera module is a key product that provides photos and videos in a mobile device such as a smartphone, a car, a smart home appliance, or other mobile device. Although an image quality of the camera module is inferior to that of a general digital camera, the camera module has become popular due to an advantage of being able to take a photo anytime and anywhere so that it is currently embedded in most smartphones. Since the photos and the videos may be freely uploaded to social media platforms through the smartphone, the camera module has recently become more and more important.

The camera module has been continuously developed to achieve high image quality, slimness, and high functionality, and a similar trend continues to this day. In order to implement the high image quality, research is being actively conducted to obtain a high-pixel-count image by reducing a pixel size of an image sensor and increasing the number of pixels per unit area.

When the pixel size of the image sensor decreases, the high-pixel-count image may be obtained, but an amount of light received per pixel decreases. To make up for this, the number of lenses increases so that a thickness of the camera module increases. For this reason, a rear camera at a back surface of the smartphone protrudes more. This is not good in terms of weight as well as design. Therefore, a part and a structure included in the camera module is being designed to be as thin as possible.

In addition, since there is a limit to the improvement in the image quality that may be obtained only by applying a high-pixel-count image sensor and slimming the camera module, an additional function such as an auto focus function that automatically focuses on a subject, an optical image stabilization (OIS) function that may take a clear photo even in a situation where the camera slightly shakes, an iris function that adjusts an amount of light, an optical zoom function that magnifies a distant subject by changing a focal length, or the function is being added to the camera module.

A camera module market has been mainly led by the smartphone, but the camera module has recently become an essential part of various home appliances as well as the smartphone. Adoption of the camera module is increasing in other applications such as a self-driving car, an augmented reality (AR) and virtual reality (VR) device, and a service robot such as a robot cleaner, and other applications.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a driving apparatus for a camera includes a first frame including a first ball guide extending in a first direction transverse to an optical axis; a second frame including a second ball guide corresponding to the first ball guide and extending in a second direction transverse to the optical axis and the first direction; a ball member disposed between the first ball guide and the second ball guide; and a retainer interposed between the first frame and the second frame and including a through hole in which the ball member is disposed.

The first ball guide and the second ball guide may extend perpendicular to each other and to the optical axis.

A diameter of the through hole may be greater than a diameter of the ball member, and may be smaller than a length along an extension direction of the first ball guide, and a length along an extension direction of the second ball guide.

The diameter of the through hole may be greater than a width of the first ball guide perpendicular to the extension direction of the first ball guide, and a width of the second ball guide perpendicular to the extension direction of the second ball guide.

The retainer may further include a rib protruding from at least one side of the retainer along a direction of the optical axis around an edge of the through hole.

The through hole may have a concavely rounded inner side surface.

A thickness of the retainer along a direction of the optical axis may be less than a diameter of the ball member.

The retainer may have four corners and four sides, and four through holes may be disposed one by one in four regions adjacent to the four corners.

Each of the first frame and the second frame may have four corners and four sides, the first ball guide may extend parallel to at least one side of the first frame, and the second ball guide may extend parallel to at least one side of the second frame.

Each of the first frame and the second frame may have four corners and four sides, the first ball guide may extend parallel to a diagonal direction of the first frame, and the second ball guide may extend parallel to a diagonal direction of the second frame.

The retainer may have four corners and four sides, and two through holes may be disposed one by one in two regions adjacent to two edges adjacent to each other among the four edges, and one through hole may be disposed in a region between two other edges among the four edges.

The retainer may have an L-shaped planar shape having a corner region and two end portions, one through hole may be disposed in the corner region, and two though holes may be disposed in the two end portions.

The retainer may further include a central opening, and the through hole and the central opening may be disposed in a same plane.

The retainer may further include a central opening, and a concave portion concavely recessed toward the central opening from an imaginary line connecting in a straight line outermost edges of regions where through holes adjacent to each other are disposed.

The driving apparatus may further include a lens holder including a central opening in which a lens barrel is disposed; a carrier on which the lens holder and the retainer are disposed; and a driver configured to apply a driving force to the lens holder in the first direction or the second direction, wherein the lens holder may include the second frame, and the carrier may include the first frame.

The driving apparatus may further include an auto focus (AF) unit in which a lens barrel and configured to drive the lens barrel in a direction of the optical axis; an image sensor module including an image sensor, a stationary frame fixed to the auto focus (AF) unit, and a moving frame to which the image sensor is fixed; and a driver configured to provide a driving force to the moving frame in the first direction or the second direction, wherein the moving frame may include the first frame, and the stationary frame may include the second frame.

In another general aspect, a camera module includes a lens barrel including a lens; a first frame including a first ball guide extending in a first direction perpendicular to an optical axis; a second frame in which the lens barrel is disposed and including a second ball guide corresponding to the first ball guide and extending in a second direction perpendicular to the optical axis and transverse to the first direction; a ball member disposed between the first ball guide and the second ball guide; a retainer interposed between the first frame and the second frame and including a through hole in which the ball member is disposed; and a lens driver configured to drive either one or both of the first frame and the second frame to move in a direction perpendicular to the optical axis.

The camera module may further include a lens holder including a central opening in which the lens barrel is disposed; and a carrier in which the lens holder and the retainer are disposed, wherein the carrier may include the first frame, the lens holder may include the second frame, and the lens driver may be further configured to apply a driving force to the lens holder to move the lens holder in the first direction or the second direction.

The camera module may further include a housing in which the lens holder and the carrier are disposed; and an auto focus (AF) driver configured to apply a driving force to the carrier to move the carrier in a direction of the optical axis.

In another general aspect, a driving apparatus includes a first frame including a first rolling guide extending in a first direction perpendicular to an optical axis; a second frame including a second rolling guide facing the first rolling guide and extending in a second direction perpendicular to the optical axis and transverse to the first direction; a rolling member disposed between the first rolling guide and the second rolling guide; a retainer interposed between the first frame and the second frame and including a through hole in which the rolling member is accommodated; and a frame driver configured to apply a driving force to either one or both of the first frame and the second frame in a direction perpendicular to the optical axis.

In another general aspect, a driving apparatus for a camera includes a first frame including a first ball guide; a second frame configured to be movable in a first direction and a second direction relative to the first frame and including a second ball guide facing the first ball guide; a ball member disposed between the first ball guide and the second ball guide; and a retainer interposed between the first frame and the second frame and including a through hole in which the ball member is disposed, wherein the first ball guide and the second ball guide are configured to enable the retainer and the ball member to move together with the second frame in the first direction in response to the second frame moving in the first direction, and to enable the retainer and the ball member to remain at a fixed position relative to the first frame in response to the second frame moving in the second direction.

The first ball guide may extend in the first direction, enable the ball member to move along the first ball guide in the first direction, and restrain the ball member from moving in the second direction, and the second ball guide may extend in the second direction, enable the ball member to move along the second ball guide in the second direction, and restrain the ball member from moving in the first direction.

The first frame, the second frame, and the retainer may be stacked in a direction of an optical axis, the first direction may be perpendicular to the optical axis, and the second direction may be perpendicular to the optical axis and the first direction.

The retainer may further include a rib protruding toward either one or both of the first frame and the second frame around an edge of the through hole.

In another general aspect, a driving apparatus for a camera includes a first frame including a plurality of first ball guides; a second frame including a plurality of second ball guides each facing a respective one of the first ball guides; a retainer interposed between the first frame and the second frame and comprising a plurality of through holes each disposed between a respective one of first ball guides and a respective one of the second ball guides; and a plurality of ball members each disposed in a respective one of the through holes, wherein the first ball guides are configured to enable the retainer and the ball members to move relative to the first frame in a first direction, and the second ball guides are configured to enable the second frame to move relative to the retainer and the ball members in a second direction perpendicular to the first direction.

The first ball guides may be further configured to prevent the retainer and the ball members from moving relative to the first frame in the second direction, and the second ball guides may be further configured to prevent the second frame from moving relative to the retainer and the ball members in the first direction.

The driving apparatus may further include a first driver configured to apply a first force to the second frame to move the second frame together with the retainer and the ball members relative to the first frame in the first direction; and a second driver configured to apply a second force to the second frame to move the second frame relative to the first frame, the retainer and the ball members in the second direction.

The first frame, the retainer, and the second frame may be stacked on top of one another in an optical axis direction perpendicular to the first direction and the second direction, and the retainer may have a shape configured to reduce friction between the retainer and the first frame, and between the retainer and the second frame.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
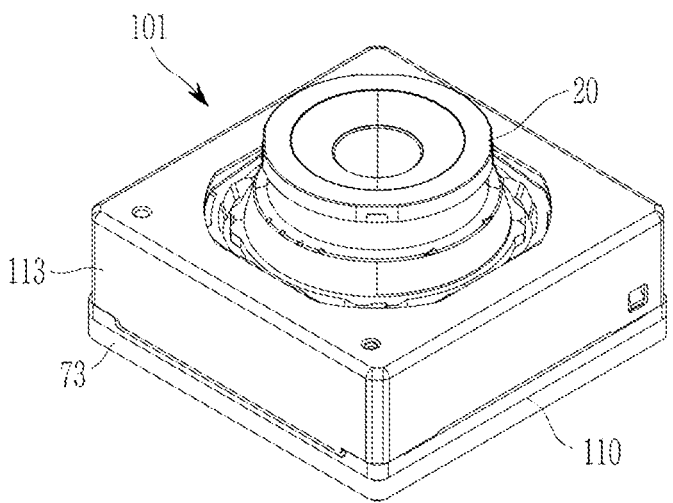
FIG. 1 is a perspective view showing an appearance of a camera module according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The use of the term "may" with respect to an example or embodiment, e.g., as to what an example or embodiment may include or implement, means that at least one example or embodiment exists in which such a feature is included or implemented, while all examples and embodiments are not necessarily limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated by 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Figure 2:
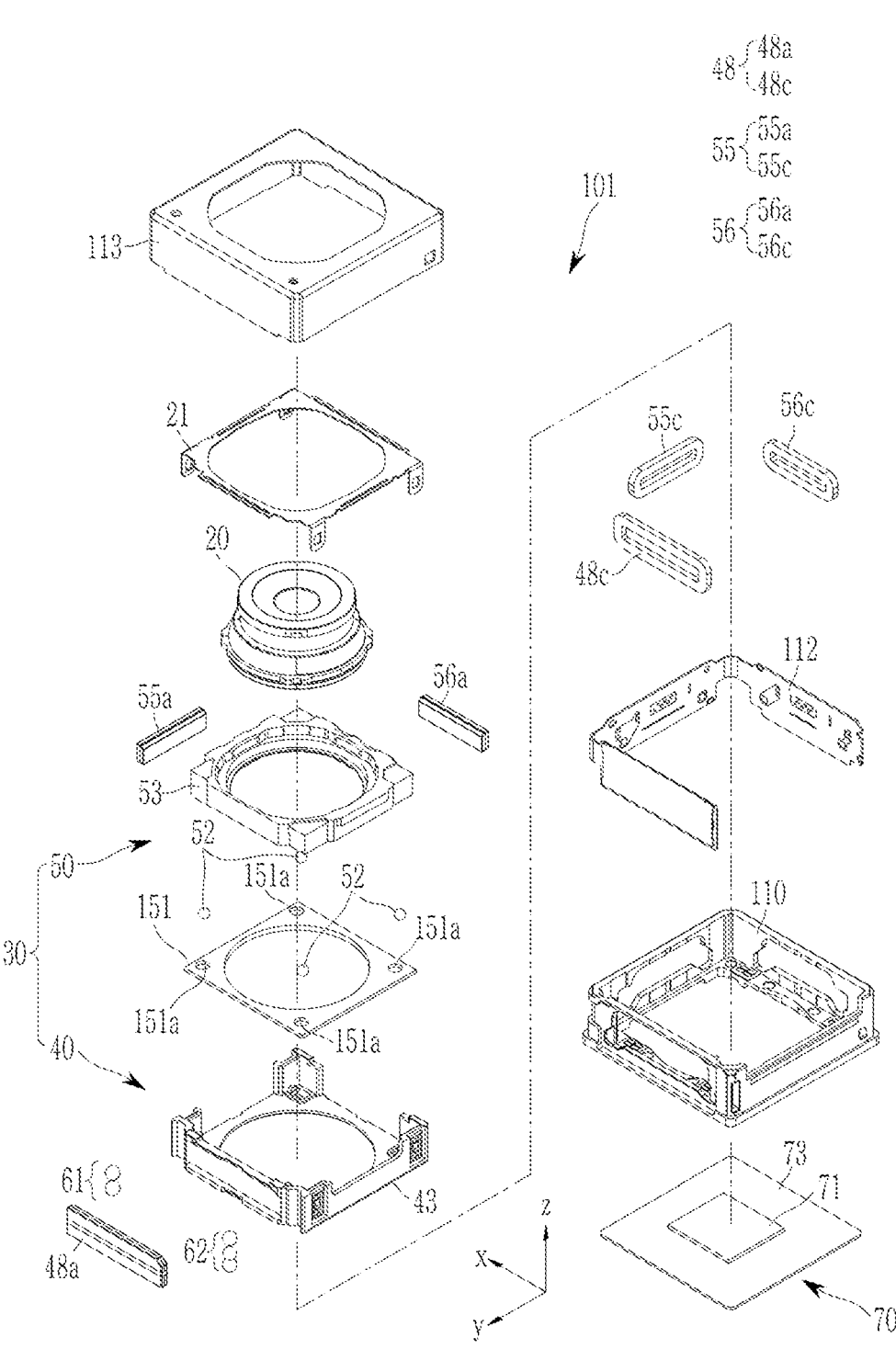
FIG. 2 is an exploded perspective view schematically showing the camera module of FIG. 1.

FIG. 1 is a perspective view showing an appearance of a camera module according to an embodiment, and FIG. 2 is an exploded perspective view schematically showing the camera module of FIG. 1.

Referring to FIGS. 1 and 2, a camera module 101 according to the present embodiment includes a lens barrel 20, a lens driving apparatus 30 that moves the lens barrel 20, an image sensor unit 70 that converts light incident through the lens barrel 20 to an electrical signal, a housing 110 accommodating the lens barrel 20 and the lens driving apparatus 30 in an internal space of the housing 110, and a cover 113 covering the housing 110.

The lens barrel 20 may have a hollow cylindrical shape so that one or a plurality of lenses for capturing an image of a subject may be accommodated therein, and when the plurality of lenses are accommodated, the plurality of lenses are aligned along an optical axis and mounted in the lens barrel 20. The plurality of lenses may include as many lenses as necessary according to a design of the lens barrel 20, and each lens may have optical characteristics such as a refractive index that may be the same as or different from the optical characteristics of the other lenses.

The optical axis may be set as a central axis of the lens accommodated in the lens barrel 20, and a direction of the optical axis is a direction parallel to the central axis. In the drawings, the optical axis is set as a z-axis, and an x-axis and a y-axis are set as directions perpendicular to the optical axis. In this case, the x-axis and the y-axis are perpendicular to each other, and an x-y plane formed by the x-axis and the y-axis is a plane perpendicular to the optical axis.

The lens driving apparatus 30 is a device that moves the lens barrel 20, and includes an auto focus (AF) unit 40 for adjusting a focus and an optical image stabilization (OIS) unit 50 for correcting a hand shake.

The lens driving apparatus 30 may adjust the focus by moving the lens barrel 20 in the direction of the optical axis (a direction of the z-axis of the drawings) using the AF unit 40, and may correct shaking during photographing by moving the lens barrel 20 in a direction (a direction of the x-axis or a direction of the y-axis of the drawings) perpendicular to the optical axis using the OIS unit 50.

The AF unit 40 includes a carrier 43 accommodating the lens barrel 20 and an AF driver 48 generating a driving force to move the lens barrel 20 and the carrier 43 in the direction of the optical axis. The AF driver 48 includes an AF driving magnet 48a and an AF driving coil 48c.

When electrical power is applied to the AF driving coil 48c, the carrier 43 may be moved in the direction of the optical axis by an electromagnetic force generated between the AF driving magnet 48a and the AF driving coil 48c. Since the lens barrel 20 is accommodated in the carrier 43, the focus may be adjusted while the lens barrel 20 is also moved in the direction of the optical axis by the movement of the carrier 43.

The AF driving magnet 48a may be mounted at one surface of the carrier 43, and the AF driving coil 48c may be mounted on the housing 110 via a substrate 112. The AF driving magnet 48a is a moving member that is mounted on the carrier 43 and moves in the direction of the optical axis together with the carrier 43, and the AF driving coil 48c is a stationary member fixed to the housing 110. However, the present disclosure is not limited thereto, and the positions of the AF driving magnet 48a and the AF driving coil 48c may be exchanged with each other.

Rolling members 61 and 62 may be disposed between the housing 110 and the carrier 43 to reduce friction between the carrier 43 and the housing 110 when the carrier 43 is moved, and guide the movement of the carrier 43 in the direction of the optical axis. For example, the rolling members 61 and 62 may have a ball shape, and may be made of a ceramic oxide material.

The OIS unit 50 is used to correct blurring of an image or shaking of a moving image due to a factor such as a user's hand shake or other disturbance when the image or the moving image is captured. When the shaking occurs during capture of the image due to the user's hand shake or other disturbance, the OIS unit 50 compensates for the shaking by imparting a relative displacement corresponding to the shaking to the lens barrel 20. For example, the OIS unit 50 may correct the shaking by moving the lens barrel 20 in first and second directions (the x-axis and y-axis directions) perpendicular to the direction of the optical axis.

The OIS unit 50 includes a guide member that guides movement of the lens barrel 20 and an OIS driver that generates a driving force to move the guide member in a direction perpendicular to the optical axis.

The guide member includes a retainer 151 and a lens holder 53. The retainer 151 and the lens holder 53 are accommodated in the carrier 43 and aligned along the direction of the optical axis, and serve to guide movement of the lens barrel 20. The retainer 151 includes a plurality of through holes 151a, and a plurality of ball members 52 are disposed in the plurality of through holes 151a. One ball member 52 may be disposed in each of the plurality of through holes 151a. The plurality of ball members 52 serve to smooth movement of the lens holder 53 in a driving process of the OIS. In addition, the plurality of ball members 52 may also function to maintain a spacing between the carrier 43 and the lens holder 53.

The OIS driver includes a first OIS driver 55 and a second OIS driver 56. The first OIS driver 55 provides a driving force in the first direction (the x-axis direction of the drawings) perpendicular to the optical axis, and the second OIS driver 56 provides a driving force in the second direction (the y-axis direction of the drawings) perpendicular to the first direction. The first OIS driver 55 includes a first OIS driving magnet 55a and a first OIS driving coil 56a. The second OIS driver 56 includes a second OIS driving magnet 56c and a second OIS driving coil 56c.

The image sensor unit 70 is a device that converts light incident through the lens barrel 20 to an electrical signal. For example, the image sensor unit 70 may include an image sensor 71 and a circuit board 73 connected to the image sensor 71, and may further include an infrared filter (not shown). The infrared filter serves to block light in an infrared region in the light incident through the lens barrel 20.

The lens barrel 20 and the lens driving apparatus 30 may be accommodated in an internal space of the housing 110. For example, the housing 110 may have a box shape in which the top and bottom are open, The image sensor unit 70 is disposed at a lower portion of the housing 110. A stopper 21 may be disposed at an upper portion of the lens barrel 20 to prevent the lens holder 53 from being separated from an internal space of the carrier 43, and the stopper 21 may be coupled to the carrier 43.

The cover 113 is coupled to the housing 110 to cover an outer surface of the housing 110, and serves to protect internal parts of the camera module 101. In addition, the cover 113 may function to shield electromagnetic waves. For example, the cover 113 may include a metal shield can to shield the electromagnetic waves so that the electromagnetic waves generated by the camera module 101 do not affect electronic parts within a portable electronic device in which the camera module 101 is mounted.

Figure 3:
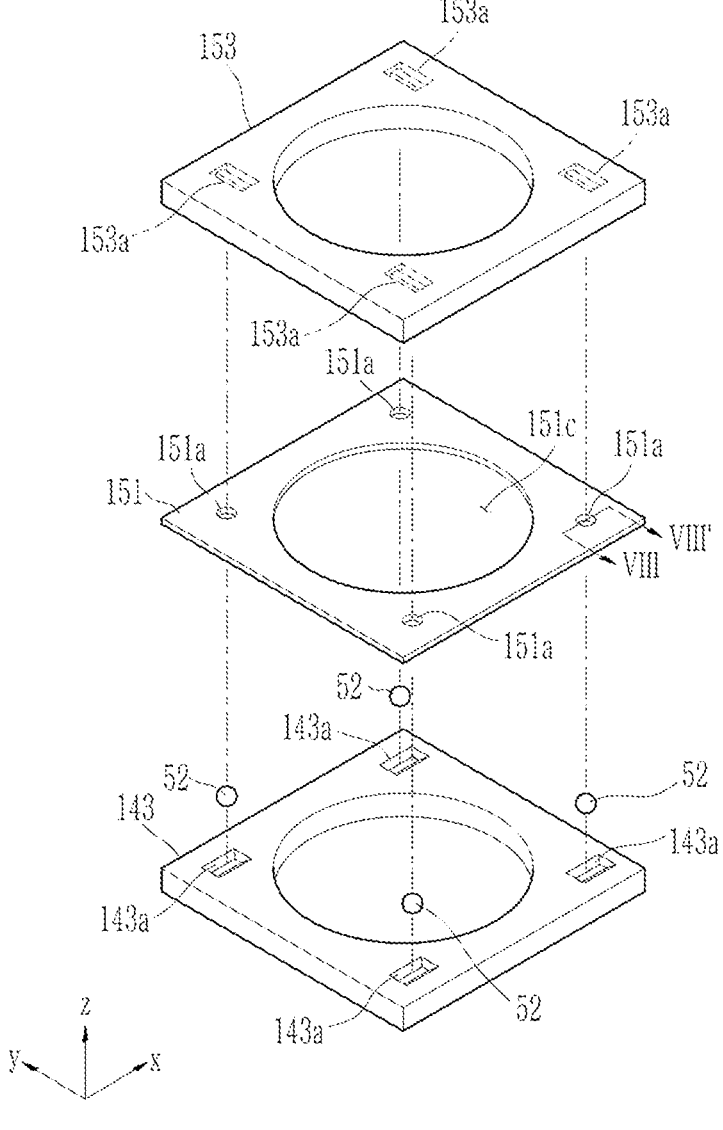
FIG. 3 is an exploded perspective view schematically illustrating a driving apparatus for a camera having a ball guide applied to the camera module shown in FIG. 1.
Figure 4:
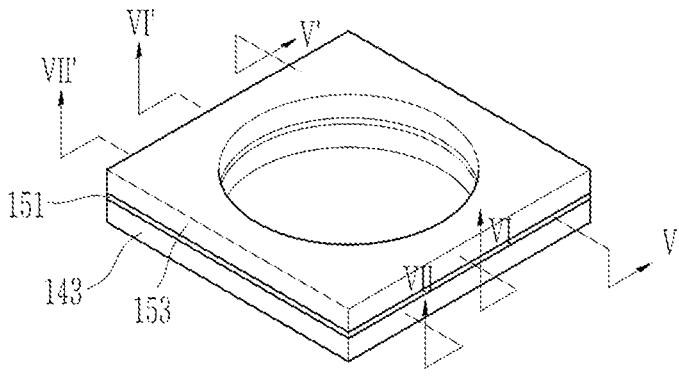
FIG. 4 is a perspective view obtained by combining the parts of the driving apparatus for the camera shown in FIG. 3.
Figure 4:
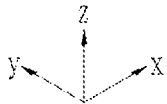

FIG. 3 is an exploded perspective view schematically illustrating a driving apparatus for a camera having a ball guide applied to the camera module shown in FIG. 1, and FIG. 4 is a perspective view obtained by combining the parts of the driving apparatus for the camera shown in FIG. 3.

The driving apparatus for the camera shown in FIGS. 3 and 4 is a device corresponding to the OIS unit 50 shown in FIG. 2, and for convenience of description and illustration, FIGS. 3 and 4 show a peripheral structure of the driving apparatus for the camera partially omitted.

Referring to FIG. 3, the driving apparatus for the camera according to the present embodiment includes a structure in which the retainer 151 is interposed between a first frame 143 and a second frame 153. The ball members 52 may be interposed between the first frame 143 and the second frame 153 while being held by the retainer 151. The first frame 143 and the second frame 153 correspond to portions of the lens holder 53 and the carrier 43 shown in FIG. 2. That is, a lower end portion of the lens holder 53 may correspond to the second frame 153, and an inner bottom portion of the carrier 43 may correspond to the first frame 143.

The first frame 143 includes a first ball guide 143a formed in an upper surface thereof. The first ball guide 143a may extend in the first direction (the x-axis direction of the drawings) crossing the optical axis. The second frame 153 includes a second ball guide 153a formed in a bottom surface thereof. The second ball guide 153a may extend in the second direction (the y-axis direction of the drawings) crossing the optical axis. Since an upper surface of the first frame 143 and a bottom surface of the second frame 153 are disposed to face each other, the first ball guide 143a and the second ball guide 153a may also be disposed to face each other.

Each of the first frame 143 and the second frame 153 may have four corners and four sides, and a plurality of first ball guides 143a and a plurality of second ball guides 153a may be provided. The plurality of first ball guides 143a may be disposed one by one in four corner regions of the first frame 143, and the plurality of second ball guides 153a may be disposed one by one in four corner regions of the second frame 153.

The retainer 151 may have the through hole 151a in which the ball member 52 is accommodated. The plurality of through holes 151a may be formed, and each through hole 151a may have a circular plane shape, and may penetrate the retainer 151 in the direction of the optical axis. The retainer 151 may have a central opening 151c passing through a center thereof, and the plurality of through holes 151a may be distributed and disposed around the central opening 151c. The central opening 151c of the retainer 151 may be an opening for securing a path of light incident to the camera module 101. In the present embodiment, the retainer 151 may have four corners, and the plurality of through holes 151a may be disposed one by one in the four corner regions. The plurality of through holes 151a and the central opening 151c may be disposed in the same plane.

The ball member 52 accommodated in the through hole 151a of the retainer 151 may be disposed between the first ball guide 143a and the second ball guide 153a. The first ball guide 143a may be formed in a form of a groove recessed from an upper surface of the first frame 143, and the second ball guide 153a may be formed in a form of a groove recessed from a bottom surface of the second frame 153. Therefore, the ball member 52 may be partially accommodated in each of the first ball guide 143a and the second ball guide 153a, and may contact the first frame 143 and the second frame 153.

As described above, when the retainer 151 is disposed between the first frame 143 and the second frame 153, the plurality of ball members 52 may be accommodated in the plurality of through holes 151a of the retainer 151 to move together with the retainer 151. Spacings between the plurality of ball members 52 that are spaced apart from each other may be maintained constant by the retainer 151.

Accordingly, when the second frame 153 is driven in the first direction or the second direction, a rotation phenomenon may be prevented.

For example, if a driving force is provided in the first direction in a state where the retainer 151 does not exist between the first frame 143 and the second frame 153, a deviation may occur in a distance in which the plurality of ball members 52 move in the first direction (the x-axis direction of the drawings). If a driving force is provided in the second direction (the y-axis direction of the drawings) in a state where the deviation occurs, the rotation phenomenon of the second frame 153 may occur.

Therefore, when a function of the OIS is implemented by interposing the retainer 151 between the first frame 143 and the second frame 153, individual driving in the first direction and the second direction may be possible and the rotation phenomenon of the second frame may be prevented.

Figure 5:
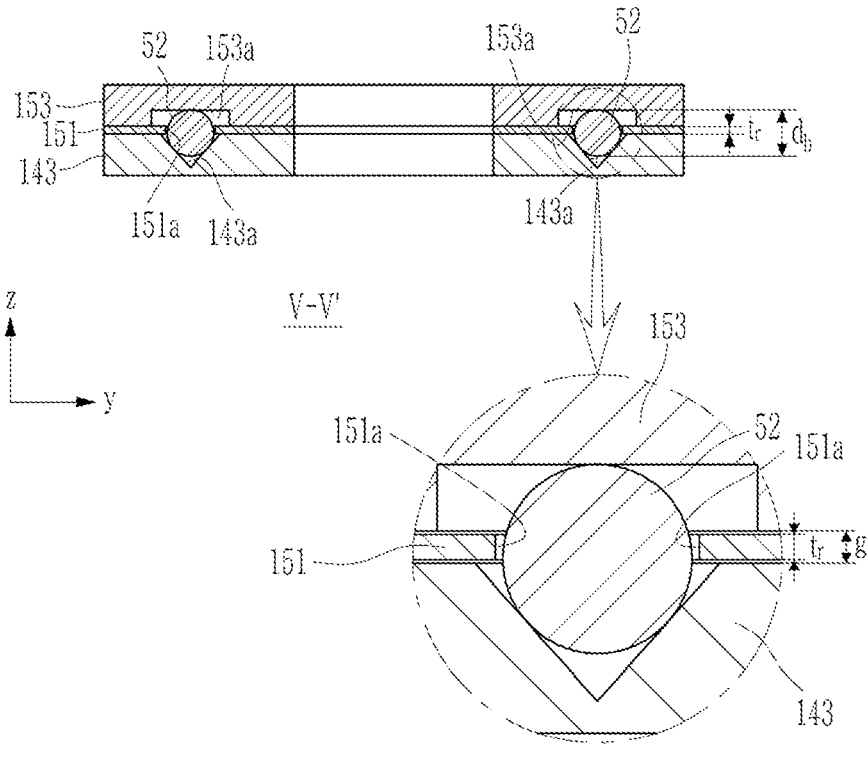
FIG. 5 is a cross-sectional view taken along the line V-V′ of FIG. 4.
Figure 6:
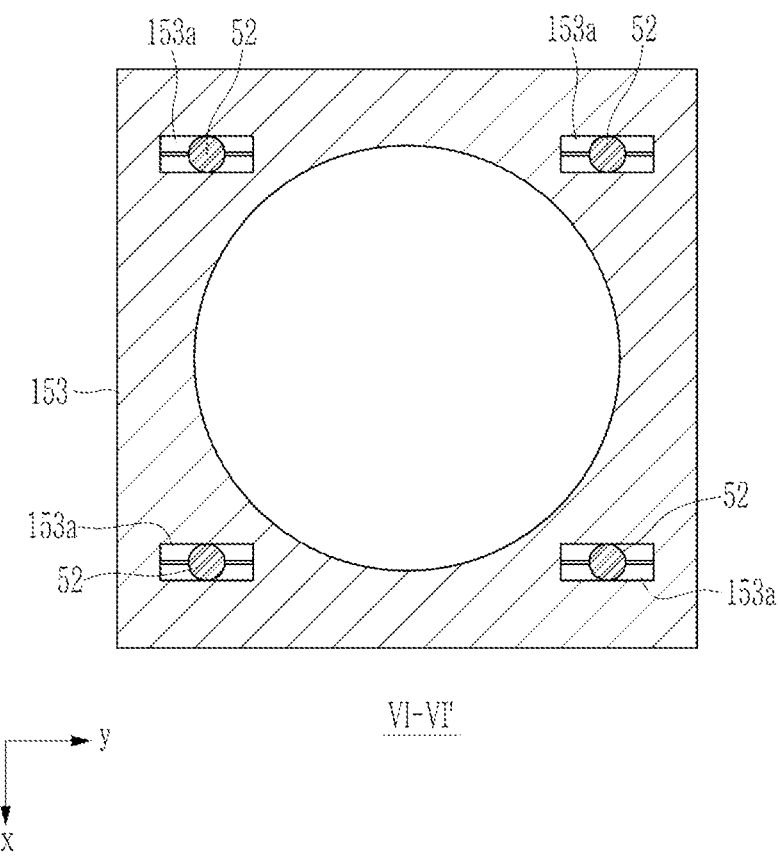
FIG. 6 is a cross-sectional view taken along the line VI-VI′ of FIG. 4.
Figure 7:
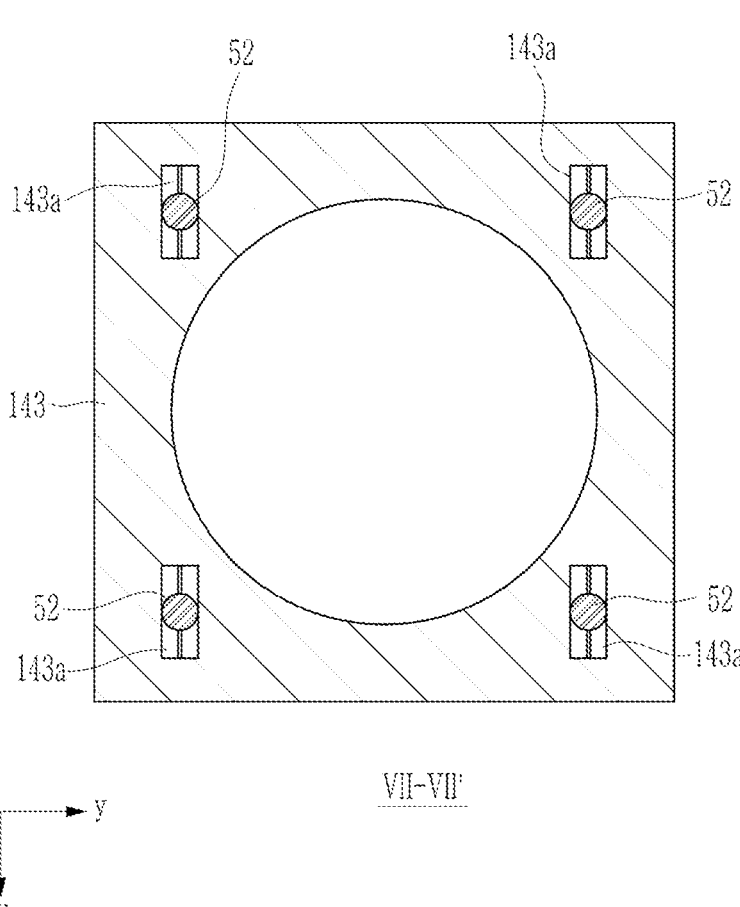
FIG. 7 is a cross-sectional view taken along the line VII-VII′ of FIG. 4.

FIG. 5 is a cross-sectional view taken along the line V-V' of FIG. 4, FIG. 6 is a cross-sectional view taken along the line VI-VI' of FIG. 4, and FIG. 7 is a cross-sectional view taken along the line VII-VII' of FIG. 4.

Referring to FIG. 5, the first ball guide 143a formed in the first frame 143 and the second ball guide 153a formed in the second frame 153 may be disposed to correspond to each other along the direction of the optical axis. The first ball guide 143a and the second ball guide 153a may be disposed to have regions at least partially overlapping each other when viewed in the direction of the optical axis. The ball member 52 interposed between the first frame 143 and the second frame 153 may be disposed at a position where the first ball guide 143a and the second ball guide 153a overlap each other. Therefore, the ball member 52 may be disposed between the first ball guide 143a and the second ball guide 153a.

Since a thickness $t_r$ along the direction of the optical axis of the retainer 151 is smaller than a diameter $d_b$ of the ball member 52, the ball member 52 accommodated in the through hole 151a may protrude up and down from top and bottom surfaces of the retainer 151. As a result, the ball member 52 may simultaneously contact the first ball guide 143a and the second ball guide 153a.

The thickness $t_r$ along the direction of the optical axis of the retainer 151 may be smaller than a distance g between the first frame 143 and the second frame 153 along the direction of the optical axis. Alternatively, the thickness $t_r$ of the retainer 151 may be equal to the distance g between the first frame 143 and the second frame 153. Therefore, the distance g between the first frame 143 and the second frame 153 may be determined according to the diameter $d_b$ of the ball member 52 and depths of the first and second ball guides 143a and 153a, and when the retainer 151 moves between the first frame 143 and the second frame 153, interference may be minimized.

Referring to FIGS. 6 and 7, the plurality of first ball guides 143a may extend in parallel with each other in the first direction (the x-axis direction of the drawings), and the plurality of second ball guides 153a may extend in parallel with each other in the second direction (the y-axis direction of the drawings). The first ball guide 143a and the second ball guide 153a may extend in directions perpendicular to each other.

Each of the first frame 143 and the second frame 153 may have four corners and four sides. In this case, the plurality of first ball guides 143a may extend parallel to any one side of the first frame 143. In addition, the plurality of second ball guides 153a may extend parallel to any one side of the second frame 153.

Figure 8:
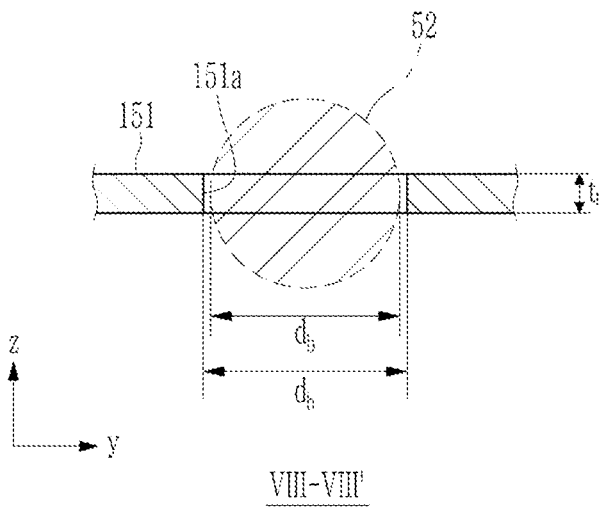
FIG. 8 is a cross-sectional view taken along the line VIII-VIII′ of FIG. 3.

FIG. 8 is a cross-sectional view taken along the line VIII-VIII' of FIG. 3.

FIG. 8 shows the ball member 52 disposed in the through hole 151*a* of the retainer 151.

Referring to FIG. 8, the through hole 151*a* of the retainer 151 according to the present embodiment may have an inner side surface perpendicular to a surface of the retainer 151. The inner side surface of the through hole 151*a* may extend along the direction of the optical axis by the thickness t$_r$ of the retainer 151.

In addition, a diameter d$_h$ of the through hole 151*a* of the retainer 151 may be greater than the diameter d$_b$ of the ball member 52. Accordingly, the ball member 52 may be translated or rotated within the through hole 151*a*. The diameter d$_h$ of the through hole 151*a* may be measured along a direction (the x-axis direction or the y-axis direction of the drawings) perpendicular to the optical axis.

Figure 9:
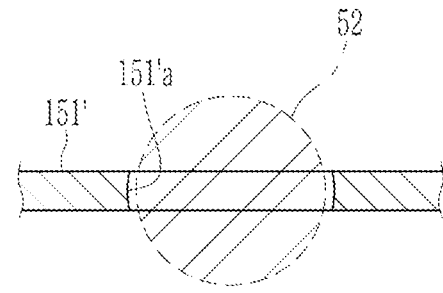
FIG. 9 is a cross-sectional view showing a through hole of a retainer according to a modified example.
Figure 9:

FIG. 9 is a cross-sectional view showing a through hole of a retainer according to a modified example.

FIG. 9 shows the ball member 52 disposed in through hole 151'*a* of a retainer 151', similar to FIG. 8.

Referring to FIG. 9, the through hole 151'*a* of the retainer 151' according to the modified example may have a concavely rounded inner side surface. The inner side surface of the through hole 151'*a* may have a curvature corresponding to an outer surface curvature of the ball member 52.

Figure 10:
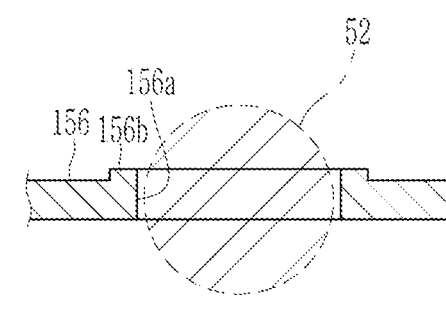
FIGS. 10 and 11 are cross-sectional views illustrating a through hole of a retainer according to another modified example.
Figure 10:
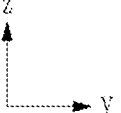
Figure 11:
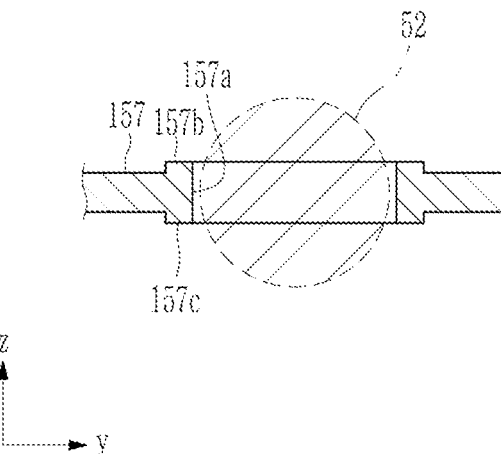

FIGS. 10 and 11 are cross-sectional views illustrating a through hole of a retainer according to other modified examples.

FIGS. 10 and 11 show the ball member 52 disposed a through hole 156*a* or 157*a* of a retainer 156 or 157, similar to FIG. 8. The retainer 156 or 157 according to the modified example may include a rib 156*b*, 157*b*, or 157*c* protruding from at least one side of the retainer 156 or 157 along the direction of the optical axis around an edge of the through hole 156*a* or 157*a*.

Referring to FIG. 10, the retainer 156 includes the rib 156*b* protruding from one side of the retainer 156 along the direction of the optical axis around the edge of the through hole 156*a*. In FIG. 10, the rib 156*b* is illustrated as protruding upward in the direction of the optical axis, but in another example, the rib 156*b* may protrude downward in the direction of the optical axis.

Referring to FIG. 11, the retainer 157 includes the ribs 157*b* and 157*c* protruding from both sides of the retainer 157 along the direction of the optical axis around the edge of the through hole 157*a*. Lengths of the ribs 157*b* and 157*c* protruding from both sides of the retainer 157 may be the same or different from each other.

As described above, the rib 156*b*, 157*b*, or 157*c* may be formed around the edge of the through hole 156*a* or 157*a* so that rigidity around the through hole 156*a* or 157*a* of the retainer 156 or 157 is increased and deformation of the edge of the through hole 156*a* or 157*a* is prevented. That is, as the retainer 156 or 157 is driven, an inner side surface of the through hole 156*a* or 157*a* may continuously contact the ball member 52, and there is a concern that the edge of the through hole 156*a* or 157*a* may be deformed due to this impact. By forming the rib 156*b*, 157*b*, or 157*c* thicker than a remaining portion of the retainer 156 or 157 around the edge of the through hole 156*a* or 157*a*, the rigidity around the through hole 156*a* or 157*a* may be relatively increased.

Figure 12A:
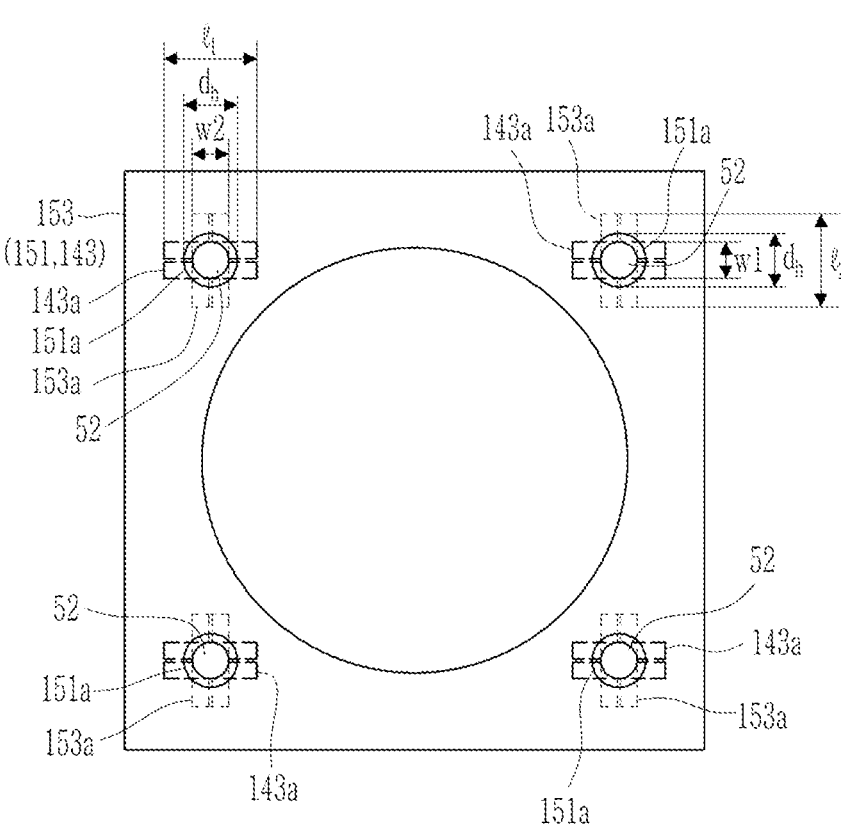
FIGS. 12A to 12C are views for explaining the driving of the driving apparatus for the camera including the retainer.
Figure 12A:
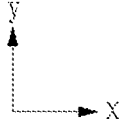
Figure 12B:
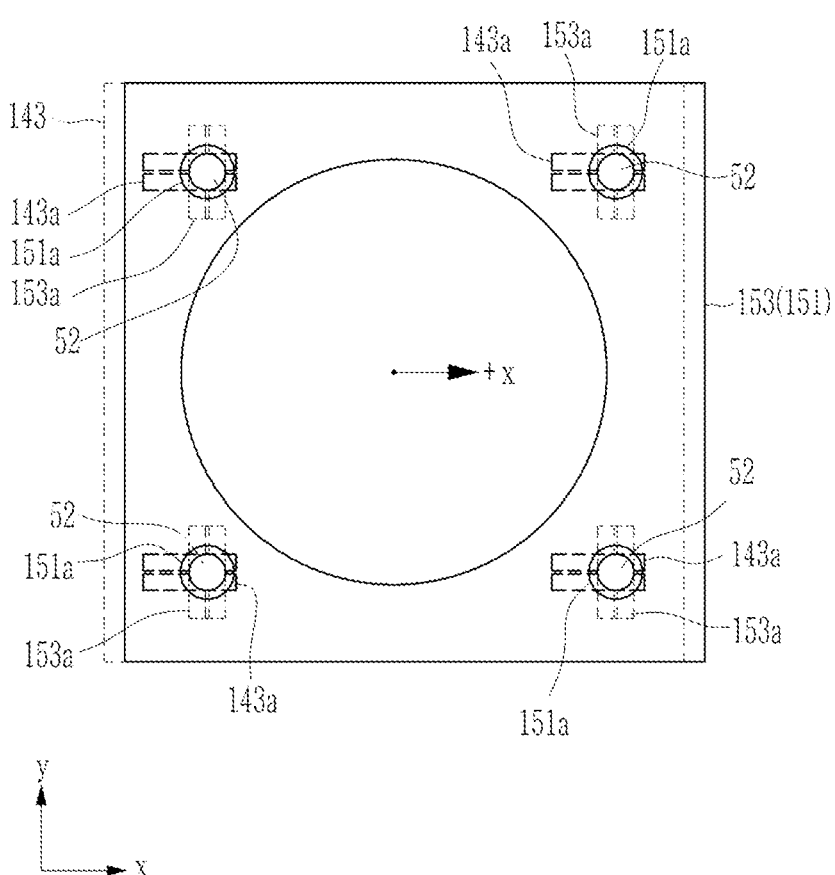
Figure 12C:
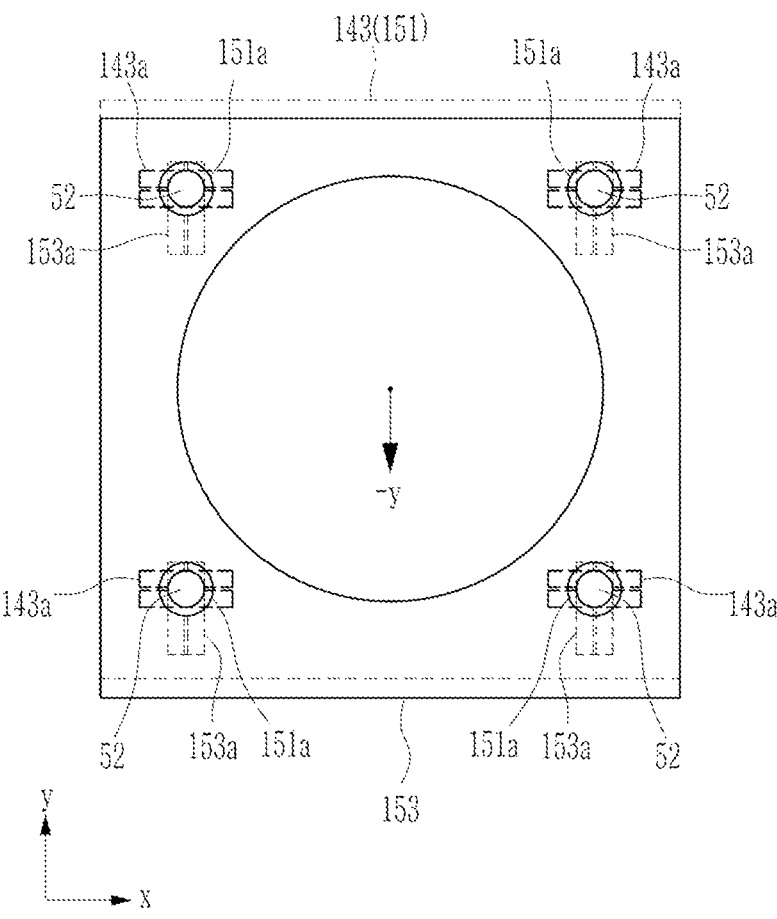

FIGS. 12A to 12C are views for explaining the driving of the driving apparatus for the camera including the retainer.

FIG. 12A is a plane view viewed in the direction of the optical axis in a state in which the second frame 153, the retainer 151, the ball member 52, and the first frame 143 of the driving apparatus for the camera are combined. FIG. 12B shows a state in which the second frame 153 is driven in the first direction with respect to the first frame 143, and FIG. 12C shows a state in which the second frame 153 is driven in the second direction with respect to the first frame 143.

Referring to FIG. 12A, the first ball guide 143*a* of the first frame 143 and the second ball guide 153*a* of the second frame 153 may be disposed to have regions overlapping each other when viewed in the direction of the optical axis. The through hole 151*a* of the retainer 151 may be disposed at a portion where the first ball guide 143*a* and the second ball guide 153*a* overlap each other in the direction of the optical axis. The ball member 52 may be accommodated within the through hole 151*a* of the retainer 151, and may be disposed at a portion where the first ball guide 143*a* and the second ball guide 153*a* overlap each other in the direction of the optical axis.

The diameter d$_h$ of the through hole 151*a* of the retainer 151 may be smaller than a length l$_1$ or l$_2$ along an extension direction of each of the first ball guide 143*a* and the second ball guide 153*a*. In addition, the diameter d$_h$ of the through hole 151*a* of the retainer 151 may be greater than a width w$_1$ or w$_2$ perpendicular to the extension direction of each of the first ball guide 143*a* and the second ball guide 153*a*. As a result, while the retainer 151 moves, the through hole 151*a* may pull the ball member 52 along the extension direction of each of the first ball guide 143*a* and the second ball guide 153*a*.

Referring to FIG. 12B, as a positive (+) driving force in the first direction is provided by the first OIS driver 55 (see FIG. 2), the second frame 153 may be moved in a +x-axis direction of the drawings. In this case, the plurality of ball members 52 may move along the extension direction of each of the plurality of first ball guides 143*a* of the first frame 143. The second ball guide 153*a* formed in the second frame 153 may extend in the second direction, and a width of the second ball guide 153*a* along the first direction may be only slightly larger than a diameter of the ball member 52. Therefore, a movement of the ball member 52 in the first direction within the second ball guide 153*a* may be restricted. As a result, the ball member 52 may be moved in the first direction together with the second frame 153. When a negative (−) driving force in the first direction is provided by the first OIS driver 55, the second frame 153 may be moved in a −x-axis direction of the drawings.

The retainer 151 may move in the +x-axis direction together with the second frame 153 while the ball member 52 is accommodated within the through hole 151*a*. The plurality of ball members 52 may be accommodated within the plurality of through holes 151*a* of the retainer 151, respectively, and spacings between the plurality of ball members 52 accommodated in the through hole 151*a* may be maintained while the plurality of ball members 52 are moving. That is, the retainer 151 may move together with the ball members 52 while holding the plurality of ball members 52 in place relative to each other.

Referring to FIG. 12C, as a negative (−) driving force in the second direction is provided by the second OIS driver 56 (see FIG. 2), the second frame 153 may be moved in a −y-axis direction of the drawings. In this case, the plurality of ball members 52 may not move together with the second frame 153, and the second frame 153 may move relative to the ball member 52 along the extension direction of the second ball guide 153*a*. The first ball guide 143*a* formed in the first frame 143 may extend in the first direction, and a width of the first ball guide 143*a* along the second direction may be only slightly larger than a diameter of the ball member 52. Therefore, a movement of the ball member 52 in the second direction within the first ball guide 143*a* may be restricted. When a positive (+) driving force in the second direction is provided by the second OIS driver 56, the second frame 153 may be moved in a +y-axis direction of the drawings.

A movement in the second direction of the retainer 151 in which the plurality of ball members 52 are accommodated within the plurality of through holes 151*a* may be restricted when the second frame 153 moves. Since a movement in the second direction of the plurality of ball members 52 is restricted by the first ball guide 143*a*, the movement in the second direction of the retainer 151 restraining the plurality of ball members 52 may be similarly restricted.

Figure 13:
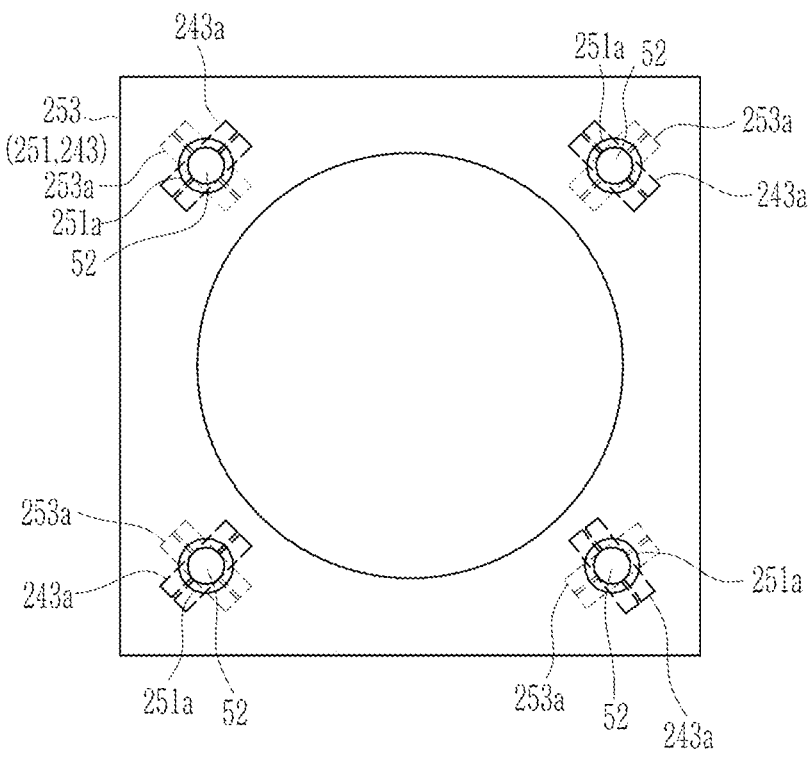
FIG. 13 is a plane view showing a driving apparatus for a camera according to another embodiment.

FIG. 13 is a plane view showing a driving apparatus for a camera according to another embodiment.

Referring to FIG. 13, the driving apparatus for the camera according to the present embodiment may basically include configurations of the driving apparatus for the camera shown in FIG. 3. However, unlike the first ball guide 143*a* and the second ball guide 153*a* shown in FIG. 3, an extension direction of a first ball guide 243*a* or a second guide 253*a* may extend in a diagonal direction of a first guide 243 or a second frame 253.

In the present embodiment, each of the first frame 243 and the second frame 253 may have four corners and four sides. A retainer 251 may also have four corners and four sides to overlap edges of the first frame 243 and the second frame 253.

A first ball guide 243*a* formed in the first frame 243 and a second ball guide 253*a* formed in the second frame 253 may be disposed to correspond to each other along the direction of the optical axis. The first ball guide 243*a* and the second ball guide 253*a* may be disposed to have regions overlapping each other when viewed in the direction of the optical axis. The ball member 52 interposed between the first frame 243 and the second frame 253 may be disposed at a position where the first ball guide 243*a* and the second ball guide 253*a* overlap each other. Therefore, the ball member 52 may be disposed between the first ball guide 243*a* and the second ball guide 253*a*.

The first ball guide 243*a* may extend parallel to a first diagonal direction of the first frame 243, and the second ball guide 253*a* may extend parallel to a second diagonal direction of the second frame 253. A diagonal of each of the first frame 243 and the second frame 253 may be defined as a line connecting opposite corners thereof to each other.

A plurality of first ball guides 243*a* may extend parallel to each other, and a plurality of second ball guides 253*a* may extend parallel to each other. In this case, the first ball guide 243*a* and the second ball guide 253*a* may extend perpendicular to each other.

Figure 14:
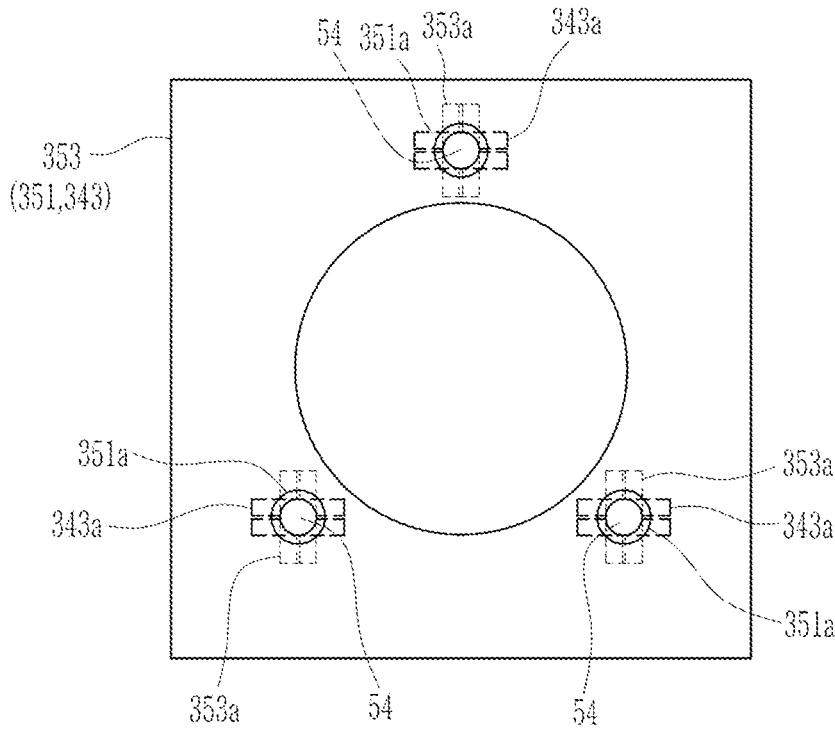
FIG. 14 is a view showing a driving apparatus for a camera according to another embodiment.

FIG. 14 is a view showing a driving apparatus for a camera according to another embodiment.

Referring to FIG. 14, the driving apparatus for the camera according to the present embodiment may basically include configurations of the driving apparatus for the camera shown in FIG. 3. However, the number and positions of the ball guides are different from those of the first ball guides 143*a* and the second ball guides 153*a* shown in FIG. 3.

A first ball guide 343*a* formed in a first frame 343 and a second ball guide 353*a* formed in a second frame 353 may be disposed to correspond to each other along the direction of the optical axis. The first ball guide 343*a* and the second ball guide 353*a* may be disposed to have regions overlapping each other when viewed in the direction of the optical axis. A ball member 54 interposed between the first frame

343 and the second frame 353 may be disposed at a position where the first ball guide 343*a* and the second ball guide 353*a* overlap each other. Therefore, the ball member 54 may be disposed between the first ball guide 343*a* and the second ball guide 353*a*.

In the present embodiment, each of the first frame 343 and the second frame 353 may have four corners and four sides. A retainer 351 may also have four corners and four sides to overlap edges of the first frame 343 and the second frame 353.

The retainer 351 may include three through holes 351*a* in which ball members 54 are accommodated. Two through holes 351*a* may be disposed one by one in two adjacent corner regions among four corners of the retainer 351, and one through hole 351*a* may be disposed between the other two corners among the four corners of the retainer 351. Two first ball guides 343*a* may be disposed one by one in two adjacent corner regions among four corners of the first frame 343, and one first ball guide 343*a* may be disposed between the other two corners among the four corners of the first frame 343. Similarly, two second ball guides 353*a* may be disposed one by one in two adjacent corner regions among four corners of the second frame 353, and one second ball guide 353*a* may be disposed between the other two corners among the four corners of the second frame 353.

The plurality of first ball guides 343*a* may extend in parallel with each other in the first direction (the x-axis direction of the drawings), and the plurality of second ball guides 353*a* may extend in parallel with each other in the second direction (the y-axis direction of the drawings). The first ball guide 343*a* and the second ball guide 353*a* may extend perpendicular to each other. As another modified example, similar to FIG. 13, the first ball guide 343*a* may extend in a first diagonal direction of the first frame 343, and the second ball guide can extend in a second diagonal direction of the second frame 353, and this also falls within the scope of the present disclosure.

Figure 15:
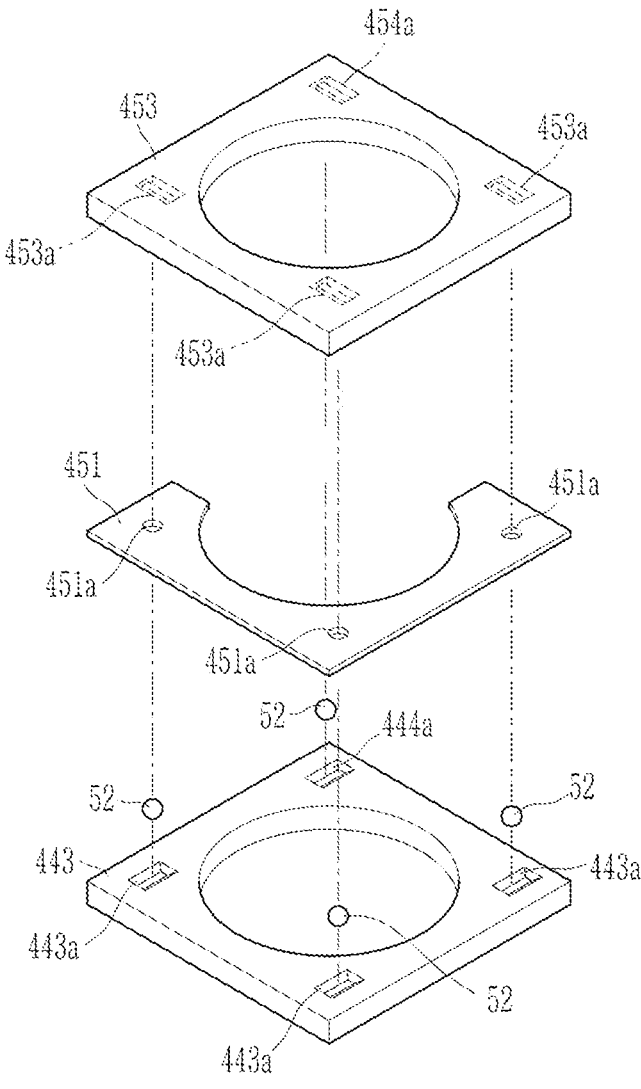
FIG. 15 is a view showing a driving apparatus for a camera according to another embodiment.

FIG. 15 is a view showing a driving apparatus for a camera according to another embodiment.

Referring to FIG. 15, the driving apparatus for the camera according to the present embodiment may basically include configurations of the driving apparatus for the camera shown in FIG. 3. However, a shape of a retainer 451 is different from a shape of the retainer 151 shown in FIG. 3.

In the present embodiment, a first ball guide 443*a* and a third ball guide 444*a* formed in a first frame 443 and a second ball guide 453*a* and a fourth ball guide 454*a* formed in a second frame 453 may be disposed to correspond to each other along the direction of the optical axis. The first ball guide 443*a* and the second ball guide 453*a* may be disposed to have regions overlapping each other when viewed in the direction of the optical axis, and the third ball guide 444*a* and the fourth ball guide 454*a* may be disposed to have regions overlapping each other when viewed in the direction of the optical axis. The ball members 52 interposed between the first frame 443 and the second frame 453 may be disposed at a position where the first ball guide 443*a* and the second ball guide 453*a* overlap each other or a position where the third ball guide 444*a* and the fourth ball guide 454*a* overlap each other. Therefore, the ball members 52 may be disposed between the first ball guide 443*a* and the second ball guide 453*a* and between the third ball guide 444*a* and the fourth ball guide 454*a*.

Each of the first frame 443 and the second frame 453 may have four corners and four sides, and a plurality of first ball guides 443*a* and a plurality of second ball guides 453*a* may be provided. The plurality of first ball guides 443*a* may be disposed one by one in three corner regions among four corner regions of the first frame 443, and the plurality of second ball guides 453a may be disposed one by one in three corner regions among four corner regions of the second frame 453. The third ball guide 444a and the fourth ball guide 454a may be disposed in the remaining corner region of the first frame 443 and the remaining corner region of the second frame 453, respectively. In this case, each of the first ball guides 443a and the second ball guides 453a may include a V-shaped groove, and each of the third ball guide 444a and the fourth ball guide 454a may include a groove having a flat bottom surface.

The retainer 451 may have an L-shaped planar shape, and may include two supporting portions that extend perpendicularly to each other and intersect each other. The retainer 451 may include a plurality of through holes 451a in which the ball members 52 are accommodated, and the plurality of through holes 451a may be disposed in a corner region and both end portions of the retainer 451, respectively. That is, the plurality of through holes 451a may include three through holes 451a disposed one by one in a region where the two supporting portions intersect each other and an end region of each of the two supporting portions.

The three through holes 451a of the retainer 451 may correspond to the first ball guides 443a of the first frame 443 and the second ball guides 453a of the second frame 453. That is, the ball members 52 accommodated in the three through holes 451a of the retainer 451 may be guided by the retainer 451 while contacting the first ball guides 443a and the second ball guides 453a. One ball member 52 may also be disposed between the third ball guide 444a and the fourth ball guide 454a that do not correspond to any of the through holes 451a of the retainer 451.

The ball members 52 accommodated in the through holes 451a of the retainer 451 may be restrained by the retainer 451 as the second frame 453 is driven to move or stay along the first ball guides 443a and the second ball guides 453a. The ball member 52 not accommodated in the through holes 451a of the retainer 451 may support the first frame 443 and the second frame 453 between the third ball guide 444a and the fourth ball guide 454a. As another example, the third ball guide 444a and the fourth ball guide 454a that do not correspond to any of the through holes 451a of the retainer 451 may be omitted, and in this case, the ball member 52 disposed between the third ball guide 444a and the fourth ball guide 454a may also be omitted.

Figure 16:
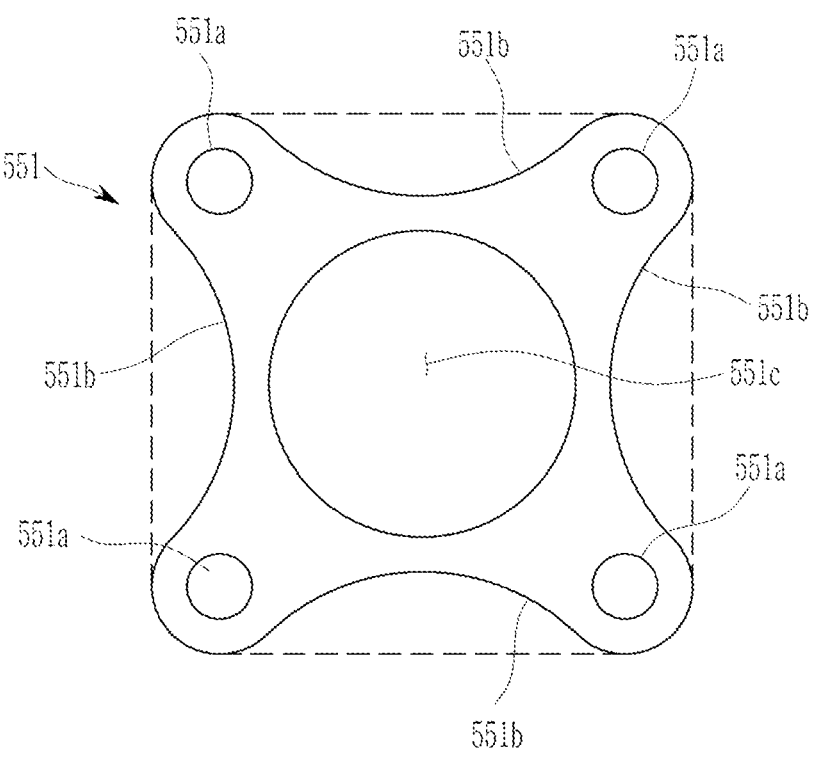
FIG. 16 is a view showing a retainer structure of a driving apparatus for a camera according to another embodiment.

FIG. 16 is a view showing a retainer structure of a driving apparatus for a camera according to another embodiment.

The retainer 551 according to the present embodiment may have a plate shape having a plurality of through holes 551a disposed around a central opening 551c, and concave portions 551b may be disposed between through holes 551a that are adjacent to each other. The concave portions 551b may have a curved shape concavely recessed toward the central opening 551c in a plane from imaginary lines (the dashed lines in FIG. 16) connecting outermost edges of the retainer 551 near which the through holes 551a adjacent to each other are disposed in a straight line.

The retainer 551 may move relative to the first frame or the second frame according to a movement of the second frame. The retainer 551 is in surface contact with the first frame and the second frame, and may slide along the first frame while the second frame is being driven in the first direction as described above with respect to FIG. 12B, and the second frame may slide along the retainer 151 while the second frame is being driven in the second direction as described with respect to FIG. 12C. The concave portions 551b may be disposed between the through holes 551a of the retainer 551 that are adjacent to each other so that a surface contact area between the retainer 551 and the first frame is reduced, and a surface contact area between the retainer 551 and the second frame is reduced. Thus, friction between the first frame and the retainer 551, and between the retainer 551 and the second frame, due to the surface contact may be reduced.

Figure 17:
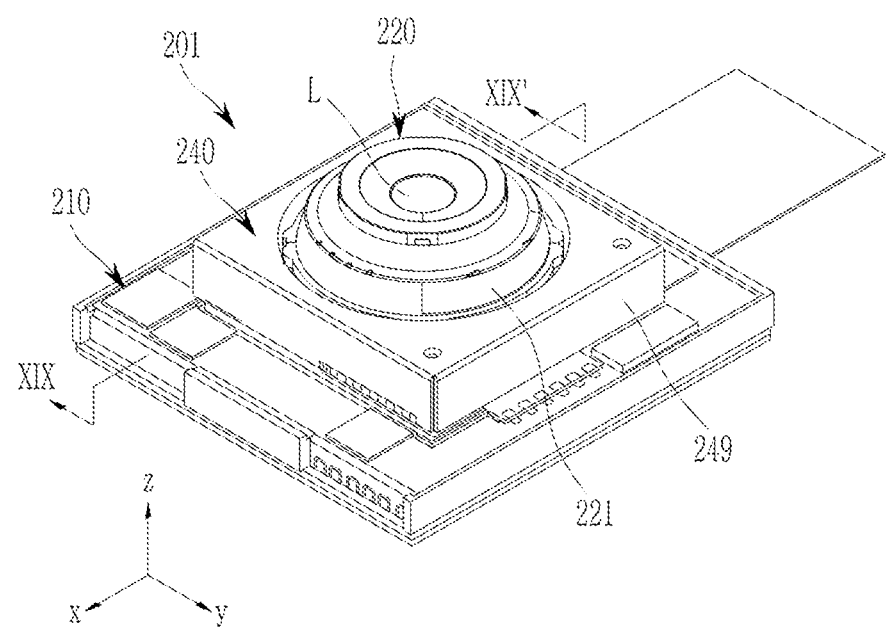
FIG. 17 is a perspective view showing an appearance of a camera module according to another embodiment.
Figure 18:
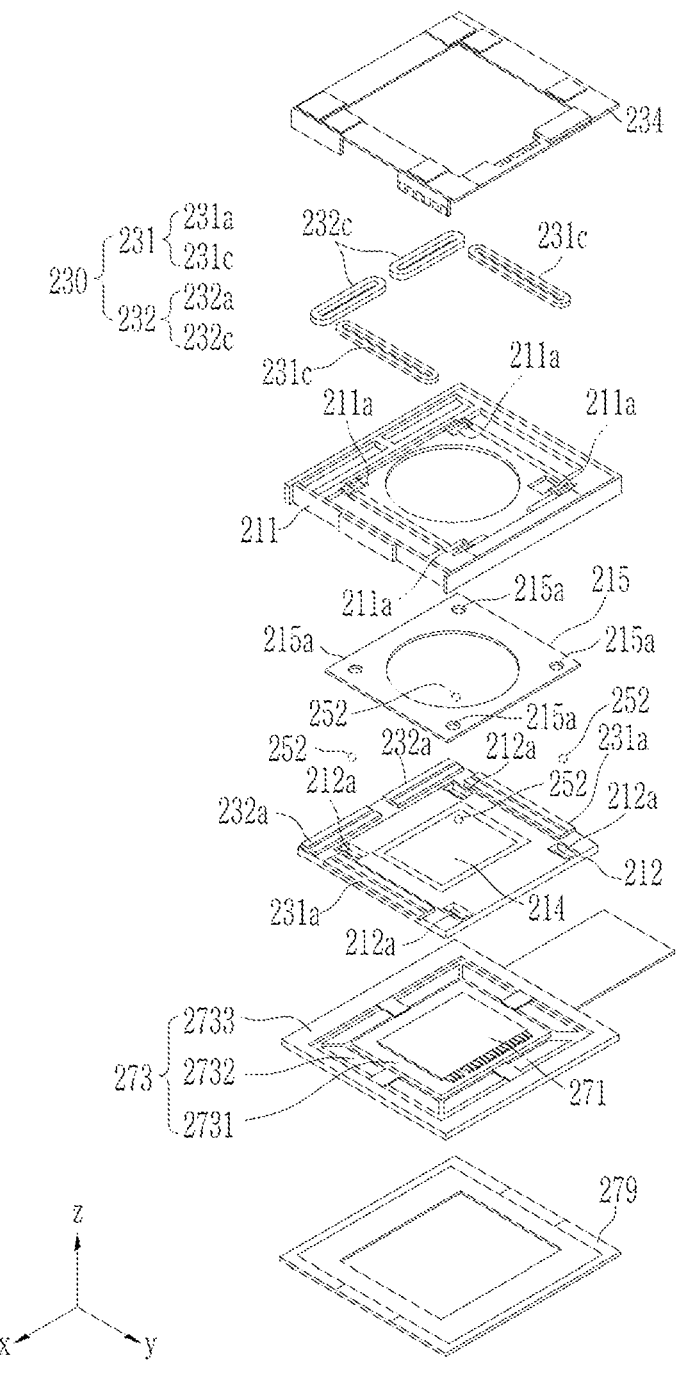
FIG. 18 is an exploded perspective view schematically showing the camera module of FIG. 17.
Figure 19:
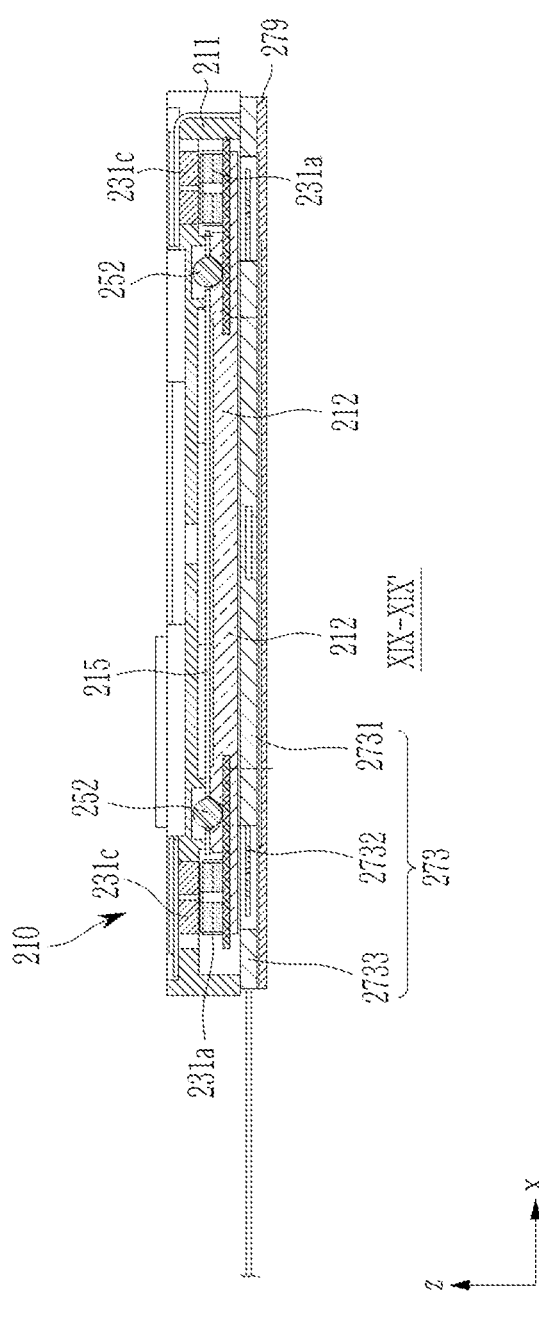
FIG. 19 is a cross-sectional view showing a sensor shift unit (or a sensor shift portion) of the camera module of FIG. 17.

FIG. 17 is a perspective view showing an appearance of a camera module according to another embodiment, FIG. 18 is an exploded perspective view schematically showing the camera module of FIG. 17, and FIG. 19 is a cross-sectional view showing a sensor shift unit (or a sensor shift portion) of the camera module of FIG. 17.

Referring to FIG. 17 and FIG. 18, a camera module 201 according to the present embodiment includes a lens module 220, an image sensor 271, a first actuator 210, and a second actuator 240. The first actuator 210 is an optical image stabilization (OIS) actuator that is a sensor shift unit, and the second actuator 240 is an auto focus (AF) actuator.

The lens module 220 includes at least one lens L and a lens barrel 221. The at least one lens L may be disposed inside the lens barrel 221. When a plurality of lenses L are provided, the plurality of lenses L may be mounted inside the lens barrel 221 along the optical axis (the z-axis of the drawings). The lens module 220 may further include a carrier (not shown, but see the carrier 43 in FIG. 2) coupled to the lens barrel 221. The carrier may include opening penetrating the carrier in the direction of the optical axis, and the lens barrel 221 may be inserted into the opening and fixed to the carrier.

The lens module 220 is a moving member that moves in the direction of the optical axis during auto focus (AF) adjustment. For this purpose, the camera module 201 according to the present embodiment includes the second actuator 240. The lens module 220 may be moved in the direction of the optical axis by the second actuator 240 to adjust a focus.

The camera module 201 according to the present embodiment may perform hand shake correction by moving the image sensor 271 instead of the lens module 220. Since a relatively light image sensor 271 is moved, the image sensor 271 may be moved with a smaller driving force. Therefore, the hand shake correction may be performed more accurately. For this purpose, the camera module 201 according to the present embodiment includes the first actuator 210. The image sensor 271 may be moved in a direction perpendicular to the optical axis by the first actuator 210 to correct the hand shake.

Referring to FIG. 18, the first actuator 210 may include a stationary frame 211, a moving frame 212, an OIS driver 230, and a sensor board 273, and may further include a base 279.

The stationary frame 211 may be coupled to the second actuator 240. In particular, the stationary frame 211 may be coupled to a housing 249 (see FIG. 17) of the second actuator 240. The housing 249 of the second actuator 240 may be seated on an upper surface of the stationary frame 211. The stationary frame 211 is a stationary member whose movement is restricted during focus adjustment and shake correction.

The moving frame 212 may be accommodated in the stationary frame 211. The stationary frame 211 may have a side wall extending downward in the direction of the optical axis so that the stationary frame 211 has an accommodation space for accommodating the moving frame 212. The moving frame 212 may be moved in a direction perpendicular to the optical axis relative to the stationary frame 211. That is, the moving frame 212 is a moving member that moves during the shake correction. An infrared filter 214 may be mounted on an upper surface of the moving frame 212. The sensor board 273 may be mounted on a lower surface of the moving frame 212.

Ball members 252 are disposed between the stationary frame 211 and the moving frame 212. The ball members 252 are disposed to contact the stationary frame 211 and the moving frame 212. When the moving frame 212 moves relative to the stationary frame 211, the ball members 252 are supported between the stationary frame 211 and the moving frame 212, and guide movement of the moving frame 212 through a rolling motion.

The image sensor 271 is mounted at the sensor board 273. One portion of the sensor board 273 may be coupled to the moving frame 212, and the other portion of the sensor board 273 may be coupled to the stationary frame 211. The image sensor 271 is mounted at the one portion of the sensor board 273 coupled to the moving frame 212. Since the one portion of the sensor board 273 is coupled to the moving frame 212, the one portion of the sensor board 273 may also be moved together with the moving frame 212 as the moving frame 212 is moved. Therefore, the image sensor 271 may be moved in a plane perpendicular to the optical axis to correct shaking during photographing.

Specifically, the sensor board 273 includes a moving portion 2731, a stationary portion 2733, and a connecting portion 2732. The image sensor 271 may be mounted at the moving portion 2731, and the moving portion 2731 may be coupled to the lower surface of the moving frame 212. The moving portion 2731 is a moving member that moves together with the moving frame 212 during the shake correction, and may be a rigid circuit board (rigid PCB). The stationary portion 2733 is coupled to a lower surface of the stationary frame 211. The stationary portion 2733 may be a stationary member that does not move during the shake correction, and may be a rigid circuit board (rigid PCB). The connecting portion 2732 may be disposed between the moving portion 2731 and the stationary portion 2733, and may connect the moving portion 2731 and the stationary portion 2733. The connecting portion 2732 may be a flexible printed circuit board (flexible PCB). When the moving portion 2731 is moved, the connecting portion 2732 disposed between the moving portion 2731 and the stationary portion 2733 may be bent.

The OIS driver 230 may generate a driving force in a direction perpendicular to the optical axis to move the moving frame 212 in a direction perpendicular to the optical axis. The OIS driver 230 includes a first sub-driver 231 and a second sub-driver 232. The first sub-driver 231 may generate a driving force in the first direction (the x-axis direction of the drawings), and the second sub-driver 232 may generate a driving force in the second direction (the y-axis direction of the drawings).

The first sub-driver 231 includes a first magnet 231*a* and a first coil 231*c*. The first magnet 231*a* and the first coil 231*c* may be disposed to face each other in the direction of the optical axis. The first magnet 231*a* is a moving member that is mounted on the moving frame 212 to move together with the moving frame 212, and the first coil 231*c* is a stationary member fixed to a circuit board 234 and the stationary frame 211.

The second sub-driver 232 includes a second magnet 232*a* and a second coil 232*c*. The second magnet 232*a* and the second coil 232*c* may be disposed to face each other in the direction of the optical axis. The second magnet 232*a* is a moving member that is mounted on the moving frame 212 to move together with the moving frame 212, and the second coil 232*c* is a stationary member fixed to the circuit board 234 and the stationary frame 211.

A retainer 215 may be disposed between the stationary frame 211 and the moving frame 212. The retainer 215 includes a through hole 215*a* accommodating the ball member 252. Therefore, the ball member 252 is disposed to contact the stationary frame 211 and the moving frame 212 in a state in which the ball member 252 is accommodated within the through hole 215*a* of the retainer 215. The ball member 252 functions to smooth movement of the moving frame 212 in the shake correction process. In addition, the ball member 252 functions to maintain a spacing between the stationary frame 211 and the moving frame 212.

A ball guide in which the ball member 252 is disposed may be formed in a surface where the stationary frame 211 and the moving frame 212 face each other in the direction of the optical axis. A plurality of ball guides may be formed to correspond to a plurality of ball members 252. A first ball guide 211*a* may be formed in a lower surface of the stationary frame 211, and a second ball guide 212*a* may be formed in an upper surface of the moving frame 212. The ball member 252 is disposed in a region where the first ball guide 211*a* and the second ball guide 212*a* overlap in the direction of the optical axis to be inserted between the stationary frame 211 and the moving frame 212.

The retainer 215 applied to the present embodiment may have the same structure as the retainer 151 described with reference to FIGS. 3 to 7. Therefore, according to the retainer 215 applied to the present embodiment, the movements described with reference to FIGS. 12A to 12C may be implemented. In this case, the first frame 143 and the second frame 153 shown in FIG. 3 correspond to portions of the stationary frame 211 and the moving frame 212 shown in FIG. 18. That is, a lower end portion of the stationary frame 211 may correspond to the second frame 153, and an inner bottom portion of the moving frame 212 may correspond to the first frame 143.

In other embodiments of the retainer 215 of the present embodiment, the retainer structures described with reference to FIGS. 13 to 16 may be selectively applied. In addition, the through hole structures according to the modified examples described with reference to FIGS. 8 to 11 may be selectively applied to the through hole 215*a* of the retainer 215 of the present embodiment.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A driving apparatus for a camera, the driving apparatus comprising:
a first frame comprising a first ball guide extending in a first direction transverse to an optical axis;
a second frame comprising a second ball guide corresponding to the first ball guide and extending in a second direction transverse to the optical axis and the first direction;
a ball member disposed between the first ball guide and the second ball guide; and
a retainer interposed between the first frame and the second frame and comprising a through hole in which the ball member is disposed,
wherein a thickness of the retainer along a direction of the optical axis is less than a diameter of the ball member.

2. The driving apparatus of claim 1, wherein the first ball guide and the second ball guide extend perpendicular to each other and to the optical axis.

3. The driving apparatus of claim 1, wherein a diameter of the through hole is greater than a diameter of the ball member, and is smaller than a length along an extension direction of the first ball guide, and a length along an extension direction of the second ball guide.

4. The driving apparatus of claim 3, wherein the diameter of the through hole is greater than a width of the first ball guide perpendicular to the extension direction of the first ball guide, and a width of the second ball guide perpendicular to the extension direction of the second ball guide.

5. The driving apparatus of claim 1, wherein the retainer further comprises a rib protruding from at least one side of the retainer along a direction of the optical axis around an edge of the through hole.

6. The driving apparatus of claim 1, wherein the through hole has a concavely rounded inner side surface.

7. The driving apparatus of claim 1, wherein the retainer has four corners and four sides, and four through holes are disposed one by one in four regions adjacent to the four corners.

8. The driving apparatus of claim 1, wherein each of the first frame and the second frame has four corners and four sides, the first ball guide extends parallel to at least one side of the first frame, and the second ball guide extends parallel to at least one side of the second frame.

9. The driving apparatus of claim 1, wherein each of the first frame and the second frame has four corners and four sides, the first ball guide extends parallel to a diagonal direction of the first frame, and the second ball guide extends parallel to a diagonal direction of the second frame.

10. The driving apparatus of claim 1, wherein the retainer has four corners and four sides, and two through holes are disposed one by one in two regions adjacent to two edges adjacent to each other among the four edges, and one through hole is disposed in a region between two other edges among the four edges.

11. The driving apparatus of claim 1, wherein the retainer has an L-shaped planar shape having a corner region and two end portions, one through hole is disposed in the corner region, and two through holes are disposed in the two end portions.

12. The driving apparatus of claim 1, wherein the retainer further comprises a central opening, and the through hole and the central opening are disposed in a same plane.

13. The driving apparatus of claim 1, wherein the retainer further comprises a central opening, and a concave portion concavely recessed toward the central opening from an imaginary line connecting in a straight line outermost edges of regions where through holes adjacent to each other are disposed.

14. The driving apparatus of claim 1, further comprising:
a lens holder comprising a central opening in which a lens barrel is disposed;
a carrier on which the lens holder and the retainer are disposed; and
a driver configured to apply a driving force to the lens holder in the first direction or the second direction,
wherein the lens holder comprises the second frame, and the carrier comprises the first frame.

15. The driving apparatus of claim 1, further comprising:
an auto focus (AF) unit configured to accommodate a lens barrel and configured to drive the lens barrel in a direction of the optical axis;
an image sensor module comprising an image sensor, a stationary frame fixed to the auto focus (AF) unit, and a moving frame to which the image sensor is fixed; and
a driver configured to provide a driving force to the moving frame in the first direction or the second direction,
wherein the moving frame comprises the first frame, and the stationary frame comprises the second frame.

16. A camera module comprising:
a lens barrel comprising a lens;
a first frame comprising a first ball guide extending in a first direction perpendicular to an optical axis;
a second frame in which the lens barrel is disposed and comprising a second ball guide corresponding to the first ball guide and extending in a second direction perpendicular to the optical axis and transverse to the first direction;
a ball member disposed between the first ball guide and the second ball guide;
a retainer interposed between the first frame and the second frame and comprising a through hole in which the ball member is disposed; and
a lens driver configured to drive either one or both of the first frame and the second frame to move in a direction perpendicular to the optical axis,
wherein a thickness of the retainer along a direction of the optical axis is less than a diameter of the ball member.

17. The camera module of claim 16, further comprising:
a lens holder comprising a central opening in which the lens barrel is disposed; and
a carrier in which the lens holder and the retainer are disposed,
wherein the carrier comprises the first frame, the lens holder comprises the second frame, and the lens driver is further configured to apply a driving force to the lens holder to move the lens holder in the first direction or the second direction.

18. The camera module of claim 17, further comprising:
a housing in which the lens holder and the carrier are disposed; and
an auto focus (AF) driver configured to apply a driving force to the carrier to move the carrier in a direction of the optical axis.

19. A driving apparatus comprising:
a first frame comprising a first rolling guide extending in a first direction perpendicular to an optical axis;
a second frame comprising a second rolling guide facing the first rolling guide and extending in a second direction perpendicular to the optical axis and transverse to the first direction;

a rolling member disposed between the first rolling guide and the second rolling guide;

a retainer interposed between the first frame and the second frame and comprising a through hole in which the rolling member is accommodated; and a frame driver configured to apply a driving force to either one or both of the first frame and the second frame in a direction perpendicular to the optical axis, wherein a thickness of the retainer along a direction of the optical axis is less than a diameter of the rolling member.

20. A driving apparatus for a camera, the driving apparatus comprising:

a first frame comprising a first ball guide;

a second frame configured to be movable in a first direction and a second direction relative to the first frame and comprising a second ball guide facing the first ball guide;

a ball member disposed between the first ball guide and the second ball guide; and a retainer interposed between the first frame and the second frame and comprising a through hole in which the ball member is disposed, wherein the first ball guide and the second ball guide are configured to enable the retainer and the ball member to move together with the second frame in the first direction in response to the second frame moving in the first direction, and to enable the retainer and the ball member to remain at a fixed position relative to the first frame in response to the second frame moving in the second direction, and wherein a thickness of the retainer along a direction of the optical axis is less than a diameter of the ball member.

21. The driving apparatus of claim 20, wherein the first ball guide extends in the first direction, enables the ball member to move along the first ball guide in the first direction, and restrains the ball member from moving in the second direction, and the second ball guide extends in the second direction, enables the ball member to move along the second ball guide in the second direction, and restrains the ball member from moving in the first direction.

22. The driving apparatus of claim 20, wherein the first frame, the second frame, and the retainer are stacked in a direction of an optical axis, the first direction is perpendicular to the optical axis, and the second direction is perpendicular to the optical axis and the first direction.

23. The driving apparatus of claim 20, wherein the retainer further comprises a rib protruding toward either one or both of the first frame and the second frame around an edge of the through hole.

24. A driving apparatus for a camera, the driving apparatus comprising:

a first frame comprising a plurality of first ball guides;

a second frame comprising a plurality of second ball guides each facing a respective one of the first ball guides;

a retainer interposed between the first frame and the second frame and comprising a plurality of through holes each disposed between a respective one of first ball guides and a respective one of the second ball guides; and a plurality of ball members each disposed in a respective one of the through holes, wherein the first ball guides are configured to enable the retainer and the ball members to move relative to the first frame in a first direction, the second ball guides are configured to enable the second frame to move relative to the retainer and the ball members in a second direction perpendicular to the first direction, and wherein a thickness of the retainer along a direction of the optical axis is less than a diameter of each of the ball members.

25. The driving apparatus of claim 24, wherein the first ball guides are further configured to prevent the retainer and the ball members from moving relative to the first frame in the second direction, and the second ball guides are further configured to prevent the second frame from moving relative to the retainer and the ball members in the first direction.

26. The driving apparatus of claim 24, further comprising:

a first driver configured to apply a first force to the second frame to move the second frame together with the retainer and the ball members relative to the first frame in the first direction; and a second driver configured to apply a second force to the second frame to move the second frame relative to the first frame, the retainer and the ball members in the second direction.

27. The driving apparatus of claim 24, wherein the first frame, the retainer, and the second frame are stacked on top of one another in an optical axis direction perpendicular to the first direction and the second direction, and the retainer has a shape configured to reduce friction between the retainer and the first frame, and between the retainer and the second frame.

* * * * *